United States Patent [19]

Isobe et al.

[11] Patent Number: 5,340,635

[45] Date of Patent: Aug. 23, 1994

[54] MAGNETIC RECORDING MEDIUM HAVING A MAGNETIC LAYER WITH A SPECIFIED VICKERS INDENTATION HARDNESS OR PLASTIC DEFORMATION

[75] Inventors: Ryosuke Isobe; Takahiro Mori, both of Hino, Japan

[73] Assignee: Konica Corporation, Tokyo, Japan

[21] Appl. No.: 888,745

[22] Filed: May 22, 1992

[30] Foreign Application Priority Data

Jun. 7, 1991 [JP] Japan .................................. 3-163904

[51] Int. Cl.⁵ ................................................ G11B 5/00
[52] U.S. Cl. ..................................... 428/141; 428/212; 428/217; 428/218; 428/328; 428/694 BN; 428/694 BM; 428/694 BR; 428/900
[58] Field of Search ............... 428/141, 212, 217, 218, 428/328, 694, 900, 694 BN, 694 BM, 694 BR

[56] References Cited

U.S. PATENT DOCUMENTS

| | | | |
|---|---|---|---|
| 4,720,411 | 1/1988 | Shimozawa et al. | 428/141 |
| 4,857,388 | 8/1989 | Ogawa et al. | 428/212 |

FOREIGN PATENT DOCUMENTS 02177125 7/1990 Japan .

OTHER PUBLICATIONS

*Encyclopedia of Polymer Science & Engineering* 1987 pp. 616, 617, 623.

*Primary Examiner*—Stevan A. Resan
*Attorney, Agent, or Firm*—Jordan B. Bierman

[57] ABSTRACT

A magnetic recording medium is disclosed. The medium has a Vickers hardness of said magnetic layer being within a range from 40 to 170, an amount of plastic deformation of said magnetic layer being in a range of 0.3–0.9 μm, and satisfies the relation of (A+200 B)≧180 wherein A is the value of said Vickers hardness and B is plastic deformation. The magnetic recording medium of the invention provides no contamination of calender rolls caused in the course of manufacturing thereof, and has running stability which is not affected by environmental conditions and which reduces clogging on a magnetic head.

5 Claims, 1 Drawing Sheet

MAGNETIC RECORDING MEDIUM HAVING A MAGNETIC LAYER WITH A SPECIFIED VICKERS INDENTATION HARDNESS OR PLASTIC DEFORMATION

BACKGROUND OF THE INVENTION

The present invention relates to a magnetic recording medium such as a magnetic disk, a magnetic tape, a magnetic sheet and so on.

In recent years, on magnetic recording media, especially on magnetic recording media for video use on which short-wave recording is needed, high recording density and high reproducing output in short-wave-recording are required. For these requirements, ferromagnetic metal powder such as $\gamma\text{-Fe}_2\text{O}_3$ fine particle of a cobalt-covered type or a doping type has been used as ferromagnetic powder.

In order to obtain a magnetic recording medium having high recording density and high reproducing output in short-wave-recording, it is required to enhance surface smoothness of a magnetic layer to the utmost. As a means for meeting this requirement, temperature and pressure for a calendering process are raised as far as possible. Therefore, calender rolls are contaminated, resulting in lower production efficiency.

For coping with the foregoing, a specific functional group is contained in polyurethane in Japanese Patent Publication Open to Public Inspection No. 302929/1990 (hereinafter referred to as Japanese Patent O.P.I. Publication). However, even when this resin is used, the problem of contamination on calender rolls can not be solved completely. The reason for this is that contamination on calender rolls is not affected simply by materials composing a magnetic layer but is affected by physical properties in coating of a magnetic layer.

Further, other trouble caused by the enhanced smoothness on the surface of the magnetic recording medium is deterioration of a traveling or running property of the magnetic recording medium. When a magnetic recording medium having high smoothness on the surface of the medium is caused to travel for a long period of time, running problems may be caused by some conditions of temperature and humidity.

In order to solve this problem, a lubricant has been added to a magnetic layer. This method, however, has proved unable to overcome the following disadvantages. Namely, independently of whether a lubricant is added to a magnetic layer or not, when the magnetic layer is pressed by a magnetic head or by a guide pin, the actual contact area between them is increased, which causes a rise in friction between the medium and the head or the guide pin, resulting in a tendency of unstable running of the medium and consequent sticking and edge-folding of the medium and clogging of the magnetic head.

SUMMARY OF THE INVENTION

An object of the present invention is to provide a magnetic recording medium by which no contamination of calender rolls is caused in the course of manufacturing thereof, having running stability which is not affected by environmental conditions and which reduces clogging on a magnetic head.

In a magnetic recording medium of the invention, a magnetic layer containing therein magnetic powder is provided on a support of the magnetic recording medium, and Vickers hardness of the magnetic layer ranges from 40 to 170 and its plastic deformation ranges from 0.3 $\mu$m to 0.9 $\mu$m, satisfying the relation of $(A+200\ B) \geq 180$ wherein the value of the Vickers hardness mentioned above is defined as A and the value of the above-mentioned plastic deformation is defined as B. An amount of deformation, in this case, means the depth generated when an indenter is pressed into the magnetic layer at the pressing speed of 1-25 nm/sec until the load reaches 50 mg under the conditions of temperature of 20°-30° C. and relative humidity of 40-80%, and then the load is released at the speed identical to the pressing speed mentioned above until the load returns to zero.

In the magnetic recording medium of the invention, it is preferable that magnetic powder therein is ferromagnetic metal powder.

Since the magnetic recording medium of the invention has a specific range of hardness and plastic deformation with regard to the magnetic layer, contamination on calender rolls does not take place even when the smoothness on the surface of the magnetic layer is enhanced for the purpose of improvement in its electromagnetic transducing property. In addition to that, clogging of a magnetic head is hardly caused, and it is possible to obtain highly reliable magnetic recording media.

DETAILED DESCRIPTION OF THE INVENTION

Since the Vickers hardness of a magnetic layer is in the range from 40 to 170 kg/mm$^2$, the magnetic layer is difficult to deform and consequently the actual contact area is prevented from increasing, and it is possible to reduce space loss by improving the property of the magnetic recording medium for contacting a magnetic head. Further, even when the roughness on the surface of the magnetic layer is caused to be greater, the magnetic layer is hardly deformed and friction does not increase. Therefore, reduction of RF output caused by so-called head beat can be prevented.

In the invention, it is preferable, for extending the above-mentioned effect, that the Vickers hardness of the magnetic layer is in the range of 45-130, and the range of 50-120 is more preferable.

In the invention, the Vickers hardness is defined as follows. Namely, the following diamond trigonal pyramid as an indenter is pressed in by a piezoelectric actuator under the following conditions.

Shape of indenter: Trigonal pyramid indenter with a vertically opposite angle of 80°
Load: 0.1 mg–0.2 g
Plunge-in speed: 1-25 nm/sec
Ambient conditions for measurement: 20°-30° C. /40-80% RH
Plunged-in depth: within 3 $\mu$m from the surface In this case, when the pressed-in depth under the load of W is defined as X, and the hardness corresponding to the pressed-in depth of $\epsilon$ is defined as H($\epsilon$), the following expression is obtained.

$$W(X) = a \int H(\epsilon)(X-\epsilon)d\epsilon \quad (a: \text{constant})$$

The following expression is for uniform material having no variety of hardness, $$W(X) = \tfrac{1}{2} a H X^2$$

therefore, a graph of load W (X) for the square of the plunged-in depth X is linear, which enables one to obtain H (Vickers hardness) from the inclination of the graph.

In the invention, it is possible to prevent contamination of calender rolls by setting an amount of plastic deformation of a magnetic layer to the specific range of 0.3–0.9 μm in addition to the above-mentioned Vickers hardness, while maintaining the high electromagnetic transducing property.

When an amount of plastic deformation is within the range related to the invention, the pressure used in the calendering operation is reduced by the deformation of a coated layer. When the deformation is less than 0.3 μm, however, the pressure is difficult to reduce and thereby destruction of the coated layer is caused, resulting in contamination of calender rolls. When the deformation exceeds 0.9 μm, on the other hand, the coated layer is extremely smoothed by the calender. A magnetic tape, therefore, tends to wind round a cylinder drum, which is more notable under the conditions of high temperature and high humidity.

It is preferable, for extending the effect of the invention, that an amount of plastic deformation of a magnetic layer is in the range of 0.4–0.8 μm, and the range of 0.5–0.7 μm is more preferable.

In the invention, the above-mentioned plastic deformation is defined as follows. Namely, the following diamond trigonal pyramid as an indenter is plunged in by a piezoelectric actuator under the following conditions Shape of indenter: Trigonal pyramid indenter with a vertically opposite angle of 80°
Load: 50 mg max.
Plunge-in speed: 1–25 nm/sec
Ambient conditions for measurement: 20°–30° C. at 40–80% RH
Plunged-in depth: within 1.5 μm from the surface Namely, an indenter is plunged in under the conditions mentioned above until the load reaches 50 mg, and then the load is released at the speed identical to the plunge-in speed until the load returns to zero. The depth (d) in that occasion is measured with a photonic sensor When the depth formed at the moment when the load starts working in the beginning of its application is defined as $d_0$, an amount of deformation is represented by $d-d_0$ (in μm). Namely, when the sample is an absolute elastic body, the amount of deformation is 0 μm.

For the Vickers hardness and the amount of plastic deformation mentioned above, an indenter with a different shape, for example, a quadrangular pyramid indenter may also be used. Even in this case, the results mostly the same as those for the trigonal pyramid indenter can be obtained.

With regard to Vickers hardness and amount of plastic deformation related to the invention, the relation $(A+200\,B) \geq 180$ is satisfied, wherein value of Vickers hardness is defined as A and value of plastic deformation is defined as B. When the value of $A+200\,B$ is less than 180, contamination of calender rollers and clogging of a magnetic head are not improved sufficiently even when the Vickers hardness and the amount of plastic deformation are within the aforementioned ranges respectively.

It is preferable, for extending the effect of the invention, that the value of $A+200\,B$ is within the range from 180 to 350, and the range of 200–300 is more preferable.

As a method for setting the aforementioned Vickers hardness value and amount of plastic deformation to be within the range mentioned above, there is available a method wherein the crystallization temperature (Tg) for resins used as a binder stated later is set to be within the range from $-30°$ C. to 80° C. In the case of polyurethane resins, for example, adjustment of the crystallization temperature can be achieved by changing the amount of isocyanate, one of the components of the resins.

In addition to that, a method of adjusting temperature in the calendering operation can be used as a method for adjusting Vickers hardness, while a method of adjusting an amount of plastic deformation by enhancing dispersibility of magnetic powder by means of introduction of a polarity functional group described later into resins used as a binder is used as a method for adjusting the amount of plastic deformation.

A magnetic recording medium of the invention is provided with at least two piled-up magnetic layers containing magnetic powder, and an amount of plastic deformation of the outermost magnetic layer is within the range of 0.3–0.9 μm, while an amount of plastic deformation of at least one of the magnetic layers other than the outermost magnetic layer is in the range of 0.3–1.3 μm. When the amount of plastic deformation of the outermost magnetic layer mentioned above is defined as C and that of at least one of the magnetic layers other than the outermost magnetic layer is defined as D, the magnetic recording medium satisfying the relation of $0.7\,C \leq D \leq 1.3\,C$ is preferable. A magnetic recording medium of this type shows less deterioration of RF after a running test and indicates improved still durability.

Though the amount of plastic deformation of a magnetic layer related to the invention is 0.3–0.9 μm on the outermost layer (upper layer), the range of 0.4–0.9 μm is preferable and the range of 0.5–0.8 μm is more preferable.

When the amount of plastic deformation of the upper layer is less than 0.3 μm, the total coated layers can not level down the pressure caused by the calender rolls and are destroyed accordingly, which causes contamination on the calender rolls. When it exceeds 0.9 μm, on the other hand, a coated layer is extremely smoothed during the calendering operation, resulting in the trouble that the tape being wound round a cylinder drum, while it is running, and stopped. This tendency is especially notable in the case of high temperature and high humidity.

Though the amount of plastic deformation of a magnetic layer other than the outermost layer (lower layer) is within the range of 0.3–1.3 μm, the range of 0.5–1.2 μm is preferable and the range of 0.6–1.0 μm is more preferable.

When the amount of plastic deformation of the lower layer is less than 0.3 μm, flexibility of a coated layer is deteriorated, and consequently, a phenomenon wherein space loss for the contact between a magnetic head and a tape is increased, that is so-called 'head beat', tends to happen even when the amount of plastic deformation of the upper layer is within the above-mentioned range. On the other hand, when it exceeds 1.3 μm, filling property of the upper layer is not improved due to extremely easy deformation of coated layers though that of the lower layer is improved even when the amount of plastic deformation of the upper layer is within the above-mentioned range. The reason for this is assumed to be that the lower layer that is easily deformed receives concentrated stress.

Further, when the value of plastic deformation amount of the upper layer mentioned above is defined as C and that of the lower layer is defined as D, the relation of $0.7 \ C \leq D \leq 1.3 \ C$ is satisfied. When the amount of plastic deformation is out of the range mentioned above, the tendency of deformation of one layer during the calendering operation differs largely from that of the other layer. Therefore, only one layer tends to receive concentrated stress and a coated layer becomes uneven in density, resulting in the running trouble of a tape which prevents improvement in electromagnetic transducing property.

With regard to the aforementioned relation between C and D, the relation of $0.8 \ C \leq D \leq 1.2 \ C$ is preferable and that of $0.9 \ C \leq D \leq 1.1 \ C$ is more preferable.

Furthermore, a magnetic recording medium wherein at least two layers including magnetic layers are superimposed, and Vickers hardness of the outermost magnetic layer is within 40–170 while that of at least one of the magnetic layers other than the outermost magnetic layer is 40–140, and the value of the Vickers hardness of the outermost magnetic layer is higher by 10 or more than that of at least one of the magnetic layers other than the outermost magnetic layer may have improved running durability.

With regard to Vickers hardness of a magnetic layer for extending the above-mentioned effect in the invention, 60–160 for the upper layer and 45–120 for the lower layer are preferable and 70–140 for the upper layer and 50–100 for the lower layer is more preferable.

Hardness of the lower layer is measured in the following way. Namely, the hardness of the lower layer is measured in the same manner as in the upper layer after the upper layer is removed by a blade or by a rotating grinder.

It is further preferable in the invention that the value of hardness of the upper layer is higher than that of the lower layer by 10 or more, and it is more preferable to be higher by 15 or more. The Vickers hardness of the lower layer established to be slightly lower than that of the upper layer as shown above causes the lower layer to serve as a cushion, thus, it is possible to prevent the occurrence of 'head beat' even when the hardness on the surface of the magnetic layer is high.

As a method for setting the aforementioned Vickers hardness values of both upper and lower layers within the above-mentioned ranges, there is available a method wherein the crystallization temperature (Tg) for resins used as a binder stated later is set to be within the range from $-30°$ C. to $80°$ C. In case of polyurethane resins, for example, adjustment of the crystallization temperature can be achieved by changing the amount of isocyanate, one of the components of the resins. In addition, adjustment of temperature conditions in the calendering operation is also effective.

As a different method, there is available a method wherein dispersibility of magnetic powder is enhanced by means of introduction of a polarity functional group described later into resins used for binders.

In order to provide a magnetic recording medium causing no contamination of calender rolls during the course of manufacturing, having excellent stable running property at high temperature and having high electromagnetic transducing property, it is preferable that the surface roughness $R_{10z}$ of the aforementioned magnetic layer is within the range of 5–20 nm. In this case, $R_{10z}$ is a value obtained by measuring the distance in the vertical direction of a surface roughness profile curve of the magnetic layer between the 2 parallel lines which are respectively selected from lines tangential to peaks of the profile and parallel with a horizontal line representing the profile as the 10th line from the highest peak and the 10th line from the lowest peak on the surface roughness profile curve that is obtained by cutting the magnetic recording medium perpendicularly to its surface for the reference length of 4 mm in its longitudinal direction on the line passing through the middle point in terms of the width of the magnetic recording medium.

Figure 2:
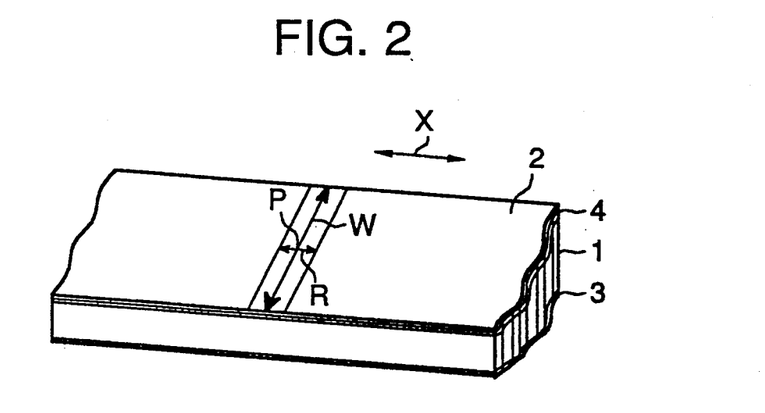
FIG. 2 is a sketch drawing of the magnetic tape.
Figure 3:
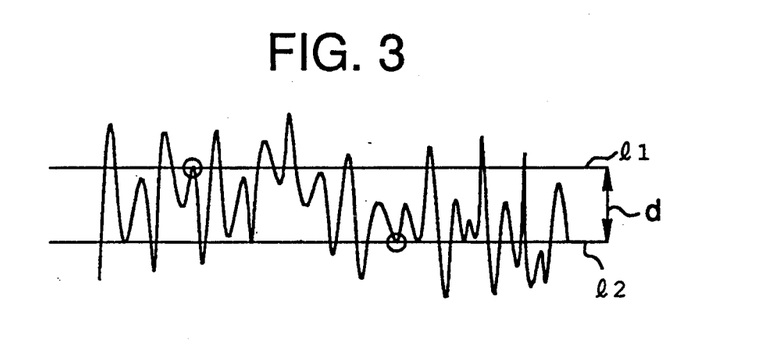
FIG. 3 is a drawing showing roughness on the surface of the magnetic tape.

Surface roughness $R_{10z}$ in the invention is a value obtained by measuring the distance d in the vertical direction of a surface roughness profile curve of the magnetic layer between the 2 parallel lines of $l_1$ and $l_2$ which are respectively selected from lines tangential to peaks of the profile and parallel with a horizontal line representing the profile as the 10th line from the highest peak and the 10th line from the lowest peak on the surface roughness profile curve that is obtained by cutting the magnetic recording medium perpendicularly to its surface for the reference length of 4 mm shown with R in the figure in its longitudinal direction on the line passing through the middle point in terms of the width of the magnetic recording medium as shown in FIG. 2.

For measuring $R_{10z}$ mentioned above, Talystep roughness tester (made by Rank Taylor Hobson) is used under the measurement conditions that the stylus is $2.5 \times 0.1 \ \mu m$ in dimension, stylus pressure is 2 mg, cut-off filter is 0.33 Hz, measurement speed is 2.5 $\mu m$/sec and reference length is 0.5 mm. Incidentally, irregularity of $0.002 \ \mu m$ or less is cut on the roughness curve.

A method for controlling the above-mentioned $R_{10z}$ to be within the range of 5–20 nm is to control the state of smoothness on the surface of the magnetic layer by setting, for example, the conditions of calendering operation in the manufacturing process described later as follows. Namely, in the surface smoothing process, there may be given temperature, linear pressure and c/s that stands for coating speed as factors to be controlled as calendering conditions. Other factors are a size and quantity of particles to be added to the magnetic layer.

For attaining the object of the invention, it is preferable that the temperature is kept at $50°$–$150°$ C., the linear pressure is kept at 50–400 kg/cm, and the c/s is kept at 20–600 m/min. When the figures mentioned above are not kept, it is difficult, or it is sometimes impossible to specify the conditions on the surface of the magnetic layer as in the present invention.

With regard to the above-mentioned surface roughness of 5–20 nm related to the invention, the range of 10–18 nm is preferable and the range of 12–16 nm is more preferable. When the surface roughness value is smaller than 5 nm, which means that the surface is extremely smoothed, a trouble that a tape is wound round a cylinder drum and is stopped tends to happen in the course of tape running under the conditions of high temperature of $40°$ C. and high humidity of 80%. When the surface roughness value exceeds 20 nm, which means that the surface roughness is high, space loss between a tape and a magnetic head increases and high output in a short wavelength zone can not be obtained.

Ferromagnetic metal powder is preferably used as magnetic powder in the invention. The ferromagnetic metal powder is metal powder of an Fe-Al type, an Fe-Ni type, or an Fe-Al-Ni type whose main ingredients are independent Fe, Ni, Co or a combination thereof, and metal powder of an Fe type is particularly preferable. These ferromagnetic metals are disclosed in Japanese Patent O.P.I. Publication No. 410458/1990.

With regard to the ferromagnetic metal powder, it is preferable to use those wherein a particle size measured with X-rays is not more than 220 Å, preferably 90–180 Å.

A particle size is measured with an X-ray as follows. Namely, a size of a particle that is a crystal is measured, by the use of an integration width of an Fe (110) diffracted ray, through Sherrer method employing Si powder as a standard in an X-ray analysis instrument.

In addition to the foregoing, a more preferable construction of ferromagnetic metal powder is one wherein a content ratio of Fe atoms to Al atoms contained in the ferromagnetic metal powder is Fe:Al=100:1–100; 20 in terms of the number of a ratio of the number of atoms, and a content ratio of Fe atoms to Al atoms staying on the surface in an analysis depth based on ESCA of the ferromagnetic metal powder of not more than 100 Å is Fe : Al=30:70–70:30 in terms of a ratio of the number of atoms. Another construction of ferromagnetic metal powder is one wherein Fe atoms, Ni atoms and Al atoms are contained in the ferromagnetic metal powder, at least one of a Zn atom and a Mn atom is further contained in the ferromagnetic metal powder, and the Fe atom content is not less than 90 in atomic percentage, and Ni atom content is not less than 1% and less than 10% by atoms, Al atom content is not less than 0.1% and less than 5% by atoms, Si atom content is not less than 0.1% and less than 5%, and Zn atom content and/or Mn atom content, or the total quantity of Zn atoms and Mn atoms when both of them are contained, is not less than 0.1% and less than 5%, and a content ratio of Fe atoms, Ni atoms, Al atoms and Si atoms plus Zn atoms and/or Mn atoms staying on the surface in an analysis depth based on ESCA of the ferromagnetic metal powder of not more than 100 Å shows the relation of Fe:Ni:Al:Si (Zn and/or Mn)=100 (4 or less):(-10–60):(10–70):(20–80) in terms of a ratio of the number of atoms.

In addition to the above, it is also possible to use iron oxide magnetic powder such as $\gamma$-$Fe_2O_3$, Co-containing $\gamma$-$Fe_2O_3$, Co-adsorbed $\gamma$-$Fe_2O_3$, $Fe_3O_4$, Co-containing $Fe_3O_4$, Co-adsorbed $Fe_3O_4$ and Co-containing and magnetic $FeO_x$ ($3/2 > x > 4/3$), oxide such as $CrO_2$, hexagonal ferrite such as barium ferrite and iron nitride.

In the invention, ferromagnetic powder that has a specific surface area of 45 $m^2/g$ or more which is based on a BET method is preferably used for coping with a tendency toward high density of recording.

Incidentally, the specific surface area of ferromagnetic powder in the invention is defined as one wherein a surface area per unit gram is expressed in square meters with respect to the surface area obtained through a measurement method for specific surface area called a BET method. Details of this specific surface area and a measuring method for it are described in "Measurement of Powder" (written under joint authorship of J. M. Dallavalle and Clydeorr Jr. and translated by Muta and others; published by Sangyo Tosho), and are further described on pages 1170–1171 in an applied edition of "Chemical Handbook" (edited by Japan Association of Chemistry and published by Maruzen Co. on Apr. 30, 1966). With regard to measurement of specific surface area of powder, the powder, for example, is subjected to heat treatment for 13 minutes at about 105° C. for degassing for the purpose of removing adsorbents on the powder, and then is guided into a measuring instrument wherein initial pressure of nitrogen is set to 0.5 kg/m² and adsorption measurement is made by nitrogen for 10 minutes at the temperature of liquid nitrogen. (−105° C.). As a measuring instrument, Quantasorb made by Yuasa Ionics Co. was used.

A bonding agent in the invention includes polyurethane, polyester and vinyl chloride resins, and it is preferable that these resins contain repetition units having at least one kind of polar group selected from a group consisting of —$SO_3M$, —$OSO_3M$, —COOM and —$PO(OM')_2$ (provided that M' represents hydrogen or an alkali metal atom such as Na, K. and Li).

The polar group mentioned above has an effect to improve dispersibility of magnetic powder, and content thereof is 0.1–8.0 mol % with more preferable content of 0.5–6.0 mol %. When the content is less than 0.1 mol %, the dispersibility is reduced while when it is more than 8.0 mol %, magnetic coating tends to gel. Preferable weight average molecular weight is within the range from 15,000 to 50,000.

Content of a bonding agent in a magnetic layer is usually within the range of 10–40 parts by weight for 100 parts by weight of ferromagnetic powder, and more preferably is in the range of 15–30 parts by weight. In this case, a ratio of polyurethane and/or polyester to vinyl chloride resins is usually within the range of 90:10–10:90 in terms of a ratio by weight, and more preferably within the range of 70:30–30:70.

When a copolymer of a vinyl chloride type is used as a bonding agent in the invention, it can be synthesized by means of addition through chemical reaction of a copolymer having an OH group such as a vinyl chloride - vinyl alcohol copolymer on a compound containing the following polar group and chlorine atoms.

$ClCH_2CH_2SO_3M$,
$ClCH_2CH_2OSO_3M$,
$ClCH_2PO(OM')_2$,
$ClCH_2COOM$ $ClCH_2CH_2SO_3Na$ selected from the above polar groups and chlorine atoms as an example shows the following.

In addition to the above, there is a method of copolymerization under the condition that everything is a copolymerizing monomer. Namely, it is possible to polymerize by pouring a predetermined quantity of reactive monomer having saturation coupling to which a repetition unit including a polar group is guided into a container for reaction such as an autoclave, and by using general polymerization initiators such as, for example, a radical polymerization initiator and a redox polymerization initiator such as BPO (benzoylperoxide) and AIBN (azobisisobutyronitrile), and polymerization initiators such as an anion polymerization initiator and a cation polymerization initiator. As a concrete example of a reactive monomer for introducing sulfonic acid or its salt, there may be given unsaturated hydrocarbon sulfonic acid such as vinylsulfonic acid, arylsulfonic acid, methacrylsulfonic acid and p-styrenesulfonic acid and salt thereof. Further, sulfoalkyl esters of acrylic acid or methacrylic acid such as 2-acrylamido-2-methyl propanesulfonic acid, sulfoethyl (metha) acrylate and sulfopropyl(metha)acrylic acid and their salt, or acrylic acid-2-ethylsulfonate may be given.

When introducing carboxylic acid or salt thereof (introduction of —COOM), (metha) acrylic acid and maleic acid may be used, and when introducing phosphoric acid or salt thereof, (metha)acrylic acid-2-phosphate may be used.

It is preferable that an epoxy group is introduced in a vinyl chloride copolymer. Owing to introduction of an epoxy group, thermal stability of a vinyl chloride copolymer may be improved. When introducing an epoxy group, preferable content of repetition unit having therein an epoxy group in a copolymer is 1-30 mol %, and more preferable content is 1-20 mol %. Glycidilacrylate is preferably used as a monomer for introduction.

With regard to technologies of introduction of a polar group into a vinylchloride copolymer, they are disclosed in Japanese Patent O.P.I. Publication Nos. 44227/1982, 108052/1983, 8127/1984, 101161/1985, 235814/1985, 238306/1985, 238371/1985, 121923/1987, 146432/1987 and 146433/1987, and they may be used in the invention.

Next, among binders related to the invention, synthesis of polyester and polyurethane resins will be explained.

Polyester is generally obtained through a method wherein polyol reacts on polybasic acid. Through this known method, it is possible to synthesize polyester having a polar group (polyol) by using polybasic acid having, as a part of polybasic acid, a polar group.

As an example of polybasic acid, it is possible to use one disclosed in Japanese Patent O.P.I. Publication No. 410458/1990.

With regard to polyester into which other polar group is introduced, it is possible to synthesize it through a known method.

With regard to synthesis of polyurethane resins, it is possible to use a method that is usually employed wherein polyol reacts on polyisocyanate. As a polyol component, polyester polyol obtained through a reaction on polyol polybasic acid is generally used. Therefore, when the aforesaid polyester polyol having a polar group is used as a material, it is possible to synthesize polyurethane having a polar group. As an example of a polyisocyanate component, it is possible to use one given in paragraph No. 0032 of Japanese Patent O.P.I. Publication No. 410458/1990.

As another method for synthesizing polyurethane, it is possible to synthesize it through addition by means of an addition reaction of polyurethane on the following compounds having a polar group and a chlorine atom.

ClCH$_2$CH$_2$SO$_3$M,
ClCH$_2$CH$_2$OSO$_3$M,
ClCH$_2$PO(OM')$_2$,
ClCH$_2$COOM

Incidentally, with regard to introduction of a polar group to polyurethane, there are descriptions in Japanese Patent Examined Publication No. 41565/1983 and Japanese Patent O.P.I. Publication Nos. 92422/1982, 92423/1982, 8127/1984, 5423/1984, 5424/1984 and 121923/1987, and they may be used for the invention.

As a bonding agent, the following resins may be used in the range of 20% by weight or less of the total bonding agents, in addition to the aforementioned resins.

Examples of the foregoing are disclosed in Paragraph No. 0036 of Japanese Patent Application No. 410458/1990.

In order to improve durability of a magnetic layer in the invention, it is preferable that polyisocyanate is contained. As a usable aromatic polyisocyanate, there may be given, for example, an addition product produced through an addition reaction of tolylenediisocyanate (DTI) on an active hydrogen compound. As a usable aliphaticpolyisocyanate, on the other hand, there may be given an addition product or the like produced through an addition reaction of hexamethylenediisocyanate (HMDI) or the like on an active hydrogen compound. Preferable weight average molecular weight of polyisocyanate is in the range from 100 to 3000.

In addition to the above, additives such as a dispersant, a lubricant, an abrasive, a matting agent, an antistatic agent and a filler may be contained.

As a dispersant, those disclosed in Paragraph No. 0039 of Japanese Patent Application No. 410458/1990, for example, may be used. It is preferable that these dispersants are added in the range of 0.5-5% by weight of ferromagnetic powder.

As a lubricant, those disclosed in Paragraph Nos. 0040, 0041, 0042 and 0043 of Japanese Patent Application No. 410458/1990, for example, may be used.

As an abrasive, those disclosed in Paragraph No. 0044 of Japanese Patent Application No. 410458/1990 may be used.

As a matting agent, those shown from the 10th line on the right side on page 4 to the 4th line on the lower left side on page 4 may be used.

As an antistatic agent, those shown in Paragraph 0045 of Japanese Patent Application No. 410458/1990 may be used.

As a hardening agent, those shown from the first line on the right side on page 9 to the 20th line on the left side on page 10 of Japanese Patent O.P.I. Publication No. 132640/1990 and those shown on the lines from the 8th to the 20th on the right side on page 6 of Japanese Patent O.P.I. Publication No. 35415/1991 may be used.

As a solvent to be mixed with the coating that forms the magnetic layer mentioned above, those shown in Paragraph No. 0046 of Japanese Patent Application No. 410458/1990 may be used.

Magnetic coating used in the invention is manufactured in the process wherein ferromagnetic powder, a bonding agent, a dispersant, a lubricant, an abrasive and an antistatic agent are kneaded and dispersed in a solvent. As an example of a kneading and dispersing machine to be used for kneading and dispersing of magnetic coating, those shown in Paragraph No. 0047 of Japanese Patent Application No. 410458/1990 are used.

As a support for the magnetic recording medium mentioned above, those disclosed in Paragraph No. 0048 of Japanese Patent Application No. 410458/1990 are used.

Figure 1:
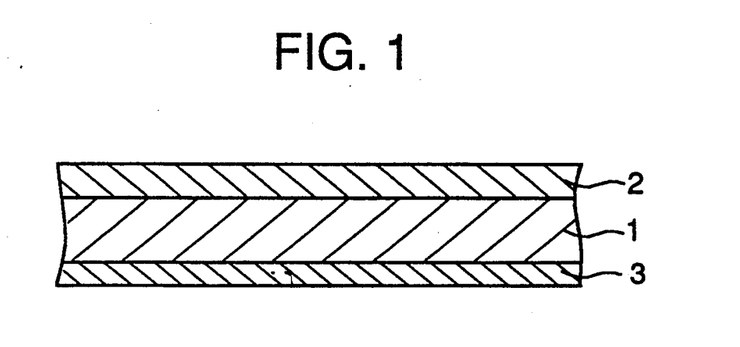
FIG. 1 shows an example of a cross-sectional view of a magnetic tape.

A magnetic recording medium of the invention is of a construction in which non-magnetic support 1 made of polyethyleneterephthalate is provided thereon with magnetic layer 2 as shown in FIG. 1 and is further provided, when necessary, with a back-coat layer (BC layer) 3 on the side opposite to that of the magnetic layer. Further, an over-coat layer (OC layer) may be provided on magnetic layer 2, or a u-coat layer (UC layer) may be provided between the magnetic layer and the support. The non-magnetic support 1 may further be subjected to corona-discharge treatment.

As an example of a coating method for forming the above-mentioned magnetic layer on the non-magnetic support, those disclosed in Paragraph No. 0050 of Japanese Patent Application No. 410458/1990 are used.

A magnetic layer coated on the non-magnetic support is dried while it is subjected to magnetic field orientation. Then, it is subjected to calendering for surface smoothing treatment. After that, varnishing treatment or blade treatment is applied thereon as necessary for subsequent slitting.

The present invention may be applied to a magnetic disk or the like as well as to a magnetic tape.

Concrete examples of the invention will be explained as follows.

Components, rates and the processing sequence shown below may be varied in many ways within a range provided that the range does not exceed the concept of the invention.

EXAMPLE 1

| | |
|---|---|
| Ferromagnetic metal powder | 100 parts by weight |
| Fe—Al type, | |
| Fe:Al = 100:5 (ratio of number of atoms)- | |
| total | |
| Fe:Al = 50:50 (ratio of number of atoms)- | |
| outer layer | |
| Major axis: 0.16 μm, Hc: 15800e, | |
| BET specific surface area: 57 m²/g, | |
| Sodium sulfate group-containing | 10 parts by weight |
| polyurethane | |
| Potassium sulfate group-containing vinyl | 10 parts by weight |
| Chloride resin (MR-110 made by Nihon | |
| Zeon) | |
| α-Alumina | 8 parts by weight |
| Stearic acid | 1 part by weight |
| Butylstealate | 1 part by weight |
| Cyclohexanone | 100 parts by weight |
| Methylethylketon | 100 parts by weight |
| Toluene | 100 parts by weight |

The above-described composite was dispersed by a ball mill for 50 hours, filtrated by a 0.5 μm filter and was mixed with a polyisocyanate compound (Colonate L made by Nihon Polyurethane) in a quantity of 5 parts by weight for obtaining a magnetic coating. This coating was coated on a non-magnetic support, then oriented (4000 gauss) and dried, subjected to calendering treatment at 80° C. and was formed to be a 2.5 micron-thick magnetic layer having Vickers hardness of 65 and plastic deformation of 0.7 μm. After that, a coating having the under mentioned composition for a back-coat layer was put in a ball mill, kneaded and dispersed for 70 hours, then filtrated by a 1 μm filter and was mixed with an isocyanate compound (Colonate L made by Nihon Polyurethane) in a quantity of 20 parts by weight for preparation of the coating. The coating was coated to a thickness of 0.5 μm on the side of the non-magnetic support opposite to that of the magnetic layer, and the support was slit to an 8 mm width to prepare an 8 mm video tape.

Composition of coating solution for a back-coat layer

| | |
|---|---|
| Carbon black (A) | 70 parts by weight |
| (average particle size 30 nm) | |
| Carbon black (B) | 30 parts by weight |
| (average particle size 60 nm) | |
| Nitrocellulose | 30 parts by weight |
| Polyurethane resin | 30 parts by weight |
| Cyclohexanone | 200 parts by weight |
| Methylethylketon | 200 parts by weight |
| Toluene | 200 parts by weight |

Conditions for measuring Vickers hardness of the foregoing were as follows.

Shape of indenter: Trigonal pyramid indenter with a vertically opposite angle of 80°

Load: 50 mg

Plunge-in speed: 12 nm/sec

Ambient conditions for measurement: 23° C./60%RH

Conditions for measuring plastic deformation were as follows.

Shape of indenter: Trigonal pyramid indenter with a vertically opposite angle of 80°.

Load: 50 mg

Plunge-in speed: 8 nm/sec

Ambient conditions for measurement: 23° C./60%RH

EXAMPLE 2–7, COMPARATIVE EXAMPLE 1–7

Video tapes for Examples and Comparative Examples were prepared in the same manner as in Example 1 except that Tg of polyurethane that is a bonding agent and temperature conditions for a calender were varied in many ways.

Details of the contents of the above-mentioned examples and results of evaluation thereof are shown in Table 1. Evaluation of performance was conducted in the following method.

(a) RF output and chroma output

RF output and chroma output were measured by the use of a color video noise meter "Shibasoku 925 C" on an 8 mm Video Movie V 900 made by Sony Corp. at a frequency of 7 MHz.

(b) Head clogging

An 8 mm video deck was modified and a 120-minute tape was driven in the modified video deck for its entire length for 50 passes repeatedly. The number of occurrences of clogging on a magnetic head during the course of running the tape was checked. Measurement was conducted under 4 kinds of measurement conditions in which temperature and humidity were changed.

(c) Calender contamination

After calendering treatment for 20,000 m at 80° C. and linear pressure of 200 kg/cm², contamination on rolls were observed visually.

(d) Drop-out

A drop-out counter VD-5M made by Nihon Victor was used for measurement of drop-out, and an average value of occurrence of drop-out per one minute was obtained from measurements for an entire length of a tape. In this case, an output which lasts for a period of not less than 5 μsec and is lower than Rf envelope output by not less than −10 dB was defined as one occurrence of drop-out.

TABLE 1A

| Example | 1 | 2 | 3 | 4 | 5 | 6 | 7 |
|---|---|---|---|---|---|---|---|
| Crystal size (X-ray diffraction) of magnetic powder (Å) | 170 | 190 | 160 | 180 | 130 | 175 | 160 |
| Polyurethane resin Tg (°C.) | 0 | 0 | −20 | 30 | 70 | 20 | 10 |
| Calender temperature (°C.) | 80 | 80 | 120 | 100 | 130 | 100 | 90 |
| Vickers hardness A | 65 | 40 | 170 | 120 | 160 | 90 | 60 |
| Plastic deformation B (μm) | 0.7 | 0.8 | 0.3 | 0.5 | 0.9 | 0.6 | 0.7 |
| A + 200 B | 205 | 200 | 230 | 220 | 340 | 210 | 180 |
| RF output (dB) | 1.5 | 2.0 | 1.0 | 1.0 | 1.0 | 1.5 | 1.5 |
| Chroma output (dB) | 1.5 | 2.0 | 1.0 | 1.5 | 1.0 | 1.5 | 1.0 |
| Head clogging | | | | | | | |
| 40° C., 20% | 0 | 0 | 0 | 1 | 0 | 0 | 0 |
| 40° C., 80% | 0 | 0 | 1 | 0 | 0 | 0 | 0 |
| 0° C., 10% | 0 | 0 | 0 | 0 | 1 | 0 | 0 |
| 23° C., 60% | 0 | 0 | 0 | 0 | 0 | 0 | 1 |
| Calender Contamination | Not observed | Not observed | Not observed | Not observed | Not observed | Not observed | Not observed |
| Drop-out | 15 | 10 | 20 | 5 | 10 | 5 | 10 |

TABLE 1B

| Comparative example | 1 | 2 | 3 | 4 | 5 | 6 | 7 |
|---|---|---|---|---|---|---|---|
| Crystal size (X-ray diffraction) of magnetic powder (Å) | 170 | 190 | 160 | 185 | 170 | 140 | 170 |
| Polyurethane resin Tg (°C.) | −20 | 80 | −20 | −20 | 80 | 80 | 30 |
| Calender temperature (°C.) | 80 | 40 | 85 | 100 | 130 | 120 | 70 |
| Vickers hardness A | 35 | 50 | 45 | 30 | 180 | 165 | 70 |
| Plastic deformation B (μm) | 0.5 | 0.2 | 1.0 | 0.8 | 0.4 | 0.2 | 0.5 |
| A + 200 B | 135 | 90 | 245 | 190 | 260 | 205 | 170 |
| RF output (dB) | 1.5 | 1.0 | 1.0 | 0.5 | −1.0 | 0.0 | 0.5 |
| Chroma output (dB) | 1.0 | 0.0 | 0.5 | 1.0 | 0.5 | 0.0 | 0.5 |
| Head clogging | | | | | | | |
| 40° C., 20% | 10 | 4 | 5 | 18 | 0 | 0 | 3 |
| 40° C., 80% | 15 | 3 | 1 | 10 | 0 | 0 | 3 |
| 0° C., 10% | 3 | 0 | 0 | 4 | 3 | 2 | 5 |
| 23° C., 60% | 0 | 0 | 0 | 12 | 4 | 1 | 6 |
| Calender contamination | Not observed | Observed | Not observed | Not observed | Observed | Observed | Observed |
| Drop-out | 15 | 100 | 20 | 25 | 130 | 110 | 135 |

From the aforementioned results, it is apparent that it is possible to obtain, by setting Vickers hardness and plastic deformation to those preferable in the invention, a magnetic recording medium which hardly causes head clogging and dropout and causes no calender contamination.

EXAMPLE 8

Coating A was prepared by kneading and dispersing the following composite for an upper layer. Coating A

| | |
|---|---|
| Ferromagnetic metal powder Fe—Al type, Fe:Al = 100:5 (ratio of number of atoms)- total Fe:Al = 50:50 (ratio of number of atoms)- outer layer Major axis: 0.16 μm, Hc: 1700Oe, BET specific surface area: 54 m²/g, X-ray particle size: 160Å | 100 parts by weight |
| Sodium sulfate group-containing polyurethane | 10 parts by weight |
| Potassium sulfate group-containing vinyl chloride resin (MR-110 made by Nihon Zeon) | 10 parts by weight |
| α-alumina | 8 parts by weight |
| Stearic acid | 1 part by weight |
| Butylstealate | 1 part by weight |
| Cyclohexanone | 100 parts by weight |
| Methylethylketon | 100 parts by weight |

-continued

| | |
|---|---|
| Toluene | 100 parts by weight |

Next, coating B was prepared by kneading and dispersing a coating composite for a lower layer which is the same as that for the upper layer except that magnetic powder in the composite for the upper layer was replaced with other ferromagnetic metal powder (Hc: 1430 Oe, major axis: 0.21 μm, BET specific surface area: 47 m²/g, and X-ray particle size: 220 Å).

Each composite mentioned above was dispersed by a ball mill for 50 hours, filtrated by a 0.5 μm filter and was mixed with a polyisocyanate compound (Colonate L made by Nihon Polyurethane) in a quantity of 5 parts by weight for obtaining magnetic coating A and B. These coatings were multilayer-coated on a support, then oriented (4000 gauss) and dried, subjected to calendering treatment at 80° C. and formed to be a 2.5 micron-thick magnetic layer with 2.0 μm of a lower layer and 0.5 μm of an upper layer having plastic deformation in the upper layer of 0.7 μm and in the lower layer of 0.7 μm. After that, coating having the undermentioned composition for a back-coat layer was put in a ball mill, kneaded and dispersed for 70 hours, then filtrated by a 1 μm filter and mixed with a isocyanate compound (Colonate L made by Nihon Polyurethane) in a quantity of 20 parts by weight for preparation of the coating. The coating was coated to a thickness of 0.5 μm on the side of the non-magnetic support opposite to that of the magnetic layer, and the support was slit to an 8 mm width to prepare an 8 mm video tape.

Composition of coating solution for a back-coat layer

| | |
|---|---|
| Carbon black (A) (average particle size 30 nm) | 70 parts by weight |
| Carbon black (B) (average particle size 60 nm) | 30 parts by weight |
| Nitrocellulose | 30 parts by weight |
| Polyurethane resin | 30 parts by weight |
| Cyclohexanone | 200 parts by weight |
| Methylethylketon | 200 parts by weight |
| Toluene | 200 parts by weight |

EXAMPLES 9-21

Various 8 mm video tapes were prepared in the same way as in Example 1 except that plastic deformation was varied in many ways by changing the kinds and physical properties of magnetic powder and Tg of bonding agent (polyurethane resin). Surface roughness ($R_{10z}$)

The surface roughness was measured by Talystep roughness tester made by Rank Taylor Hobson under the conditions of stylus that measures 2.5×0.1 μm, stylus pressure of 2 mg, cut-off filter of 0.33 Hz, measuring speed of 2.5 μm/sec and standard length of 0.5 mm. Incidentally, irregularities of not more than 0.002 μm were neglected.

TABLE 2A

| Examples | 8 | 9 | 10 |
|---|---|---|---|
| <Upper layer> | | | |
| Magnetic powder*¹ | ① | ① | ① |
| Hc (Oe) | 1700 | 1750 | 1700 |
| *²Bonding agent Tg (°C.) | 20 | −20 | −20 |
| Bonding agent addition amount (parts)*³ | 10 | 12 | 13 |
| Plastic deformation (μm) | 0.7 | 0.3 | 0.3 |
| × 0.7*⁴ | 0.49 | 0.21 | 0.21 |
| × 1.3*⁴ | 0.91 | 0.39 | 0.39 |
| Vickers hardness | 65 | 170 | 170 |
| <lower layer> | | | |
| Magnetic powder*¹ | ① | ① | ② |
| Hc (Oe) | 1430 | 1550 | 900 |
| *²Bonding agent Tg (°C.) | 20 | 20 | 20 |
| Bonding agent addition amount (parts)*³ | 8 | 11 | 6 |
| Plastic deformation (μm) | 0.7 | 0.3 | 0.3 |
| Calender contamination | Not observed | Not observed | Not observed |
| Surface roughness $R_{10z}$ (nm) | 18 | 16 | 19 |
| RF output (dB) | 1.5 | 2.0 | 2.0 |

*¹Magnetic powder ① is ferromagnetic metal powder, and ②/0 is a Co-containing iron oxide.
*²A bonding agent is sodium sulfonic acid group-containing polyurethane resin.
*³Addition amount of polyurethane resin (parts) is for 100 parts of magnetic powder.
*⁴"× 0.7" and "× 1.3" mean respectively the value of plastic deformation of the upper layer multiplied by 0.7 and that multiplied by 1.3.

Edge folding and head clogging

An 8 mm video deck was modified and a 120-minute tape was driven in the modified video deck over its entire length for 100 passes repeatedly. During the course of running of the tape, edge folding of the tape and clogging on a magnetic head were checked. Ambient temperature for the measurement was 40° C. and relative humidity was 80%.

TABLE 3A

| Examples | 11 | 12 | 13 | 14 | 15 | 16 |
|---|---|---|---|---|---|---|
| <Upper layer> | | | | | | |
| *Kind of magnetic powder | ① | ① | ① | ① | ① | ① |
| Polyurethane resin Tg (°C.) | −10 | 70 | −20 | 10 | 0 | 60 |
| Addition amount (parts) | 10 | 12 | 10 | 10 | 10 | 9 |
| Calender temperature (°C.) | 90 | 120 | 80 | 100 | 90 | 95 |
| Plastic deformation | 0.7 | 0.7 | 0.7 | 0.6 | 0.7 | 0.6 |
| Vickers hardness | 60 | 155 | 50 | 80 | 70 | 90 |
| <lower layer> | | | | | | |
| *Kind of magnetic powder | ② | ② | ② | ② | ① | ② |
| Polyurethane resin Tg (°C.) | −10 | 70 | 20 | 30 | −10 | 40 |
| Addition amount (parts) | 10 | 8 | 9 | 10 | 10 | 9 |
| Vickers hardness | 40 | 140 | 65 | 80 | 50 | 80 |
| RF output (dB) | 2.5 | 1.5 | 1.0 | 1.0 | 2.5 | 2.0 |
| Edge folding | Not observed | Not observed | Not observed | Not observed | Not observed | Not observed |
| Head clogging (40° C., 80% RH) | Not observed | Not observed | Not observed | Not observed | Not observed | Not observed |

*Kind of magnetic powder ① represents ferromagnetic powder shown in Example 1, and ② represents Co-γ-Fe₂O₃ shown in Example 1.

Output decline (RF output decline after the test of running durability)

A tape was subjected to videotaping 100 times at a temperature of 40° C. and humidity of 20%, and difference of output between the RF output in the first videotaping and that in the 100th videotaping was indicated in dB.

Still durability

An 8 mm video deck S - 900 (made by Sony Corp.) was left under the conditions of 40° C. and 20%, and a period of time in minutes required for an output level to fall by 2 dB from its initial output level on a still mode was measured. A symbol of "120 ↑" in Table 1 represents "not less than 120 minutes".

TABLE 4A

| Examples | 17 | 18 | 19 | 20 | 21 |
|---|---|---|---|---|---|
| Crystal size (X-ray diffraction) of magnetic powder (Å) | 140 | 230 | 160 | 180 | 170 |
| *1Polyurethane resin Tg (°C.) | 10 | 10 | 10 | 70 | −20 |
| *2Addition amount (parts) | 10 | 10 | 7 | 10 | 9 |
| Vinyl chloride resin *2Addition amount (parts) | 10 | 10 | 7 | 10 | 9 |
| Calender temperature (°C.) | 80 | 80 | 80 | 120 | 110 |
| Plastic deformation (μm) | 0.6 | 0.3 | 0.9 | 0.6 | 0.7 |
| Vickers hardness | 90 | 170 | 160 | 90 | 60 |
| Surface roughness $R_{10z}$ (nm) | 13 | 20 | 10 | 18 | 5 |
| Calender contamination | o | o | o | o | o |
| Lumi S/N (dB) | 1.5 | 1.2 | 2.0 | 1.3 | 2.5 |
| Chroma S/N (dB) | 1.3 | 1.0 | 1.3 | 1.2 | 1.5 |
| Output decline (dB) | 0.3 | 0.1 | 0.5 | 0.4 | 0.3 |
| Head clogging | 1 | 0 | 0 | 1 | 0 |
| Still durability (minute) | 120 ↑ | 120 ↑ | 120 ↑ | 120 ↑ | 120 ↑ |

*1"Polyurethane resin" is sodium sulfonic acid group-containing polyurethane resin.
*2"Addition amount" is represented in terms of "parts by weight" for 100 parts of magnetic powder.

What is claimed is:

1. A magnetic recording medium comprising a support having provided thereon a magnetic layer containing a magnetic powder, wherein a Vicker's hardness of said magnetic layer is 40 to 170 kg/mm², an amount of plastic deformation of said magnetic layer is 0.3 to 0.9 μm, and said material satisfies the following relationship:

$$(A+200B) \leq 180$$

wherein Vickers hardness is defined as A, and plastic deformation is defined as B, plastic deformation being equal to a depth of an indentation formed on the surface of said magnetic layer when a diamond trigonal pyramid indenter, in which an angle between opposite faces thereof is 80°, is plunged into said magnetic layer to a maximum depth of 1.5 μm, at a speed of 1 to 25 nm per second, at a temperature of 20° C. to 30° C., and a relative humidity of 40% to 80%, until a load thereon reaches 50 mg, said load then being released to 0 at a speed identical to the speed at which said indenter is plunged into said magnetic layer.

2. The magnetic recording medium of claim 1, wherein said magnetic powder is ferromagnetic metal powder.

3. The magnetic recording medium of claim 1, wherein said magnetic layer is an outermost magnetic layer provided opposite to said support, further a magnetic layer other than said outermost magnetic layer is provided between said outermost magnetic layer and said support, said magnetic recording medium satisfes the relation of 0.7 C≦D≦1.3 C, wherein an amount of plastic deformation of said outermost magnetic layer is defined as C and that of said magnetic layer other than said outermost magnetic layer is defined as D.

4. A magnetic recording medium .comprising a support having thereon a at least two layers including magnetic layers are superimposed, and Vickers hardness of the outermost magnetic layer is within 40–170 Kg/mm² while that of at least one of the magnetic layers other than the outermost magnetic layer is 40–140 Kg/mm² and the value of the Vickers hardness of the outermost magnetic layer is higher by 10 Kg/mm² or more than that of at least one of the magnetic layers other than the outermost magnetic layer.

5. A magnetic recording medium comprising a support, having provided thereon, a magnetic layer containing a magnetic powder, said magnetic layer having a surface roughness $R_{10z}$ of 5 to 20 nm, wherein $R_{10z}$ is a value obtained by measuring the distance in a vertical direction of a surface roughness profile curve of said magnetic layer between two parallel lines respectively selected from lines tangential to peaks of the profile and parallel with a horizontal line representing a profile of the tenth line from the highest peak and the tenth line from the lowest peak on the surface roughness profile curve obtained by cutting a magnetic recording medium perpendicularly to its surface for the reference length of 4 mm in its longitudinal direction on a line passing through the middle point in terms of width of said magnetic recording medium, said magnetic layer further displaying a plastic deformation of 0.3 to 0.9 μm, said plastic deformation being a depth of an indentation formed on the surface of said magnetic layer when a diamond trigonal pyramid indenter, in which an angle between opposite faces thereof is 80°, is plunged into said magnetic layer, to a maximum depth of 1.5 μm, at a speed of 1 to 25 nm per second, at a temperature of 20° C. to 30° C., and a relative humidity of 40% to 80%, until the load thereof reaches 50 mg, and then releasing said load to 0 at a speed identical to that at which said indenter is plunged into said magnetic layer.

* * * * *